(12) United States Patent
Tomay et al.

(10) Patent No.: US 9,164,874 B1
(45) Date of Patent: Oct. 20, 2015

(54) TESTING CONVERSION AND RENDERING OF DIGITAL CONTENT

(71) Applicant: Amazon Technologies, Inc., Reno, NV (US)

(72) Inventors: Beryl Tomay, Newcastle, WA (US); Thomas Grant Fraser, Edmonds, WA (US); Lokesh Joshi, Mercer Island, WA (US); Daniel Alexander Lutker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 14/136,792

(22) Filed: Dec. 20, 2013

(51) Int. Cl.
*G06F 11/00* (2006.01)
*G06F 11/36* (2006.01)

(52) U.S. Cl.
CPC ................... *G06F 11/366* (2013.01)

(58) Field of Classification Search
CPC ... G06F 11/366; G06F 17/00; H04N 1/00029; H04N 1/00045
See application file for complete search history.

(56) References Cited

U.S. PATENT DOCUMENTS

| | | | |
|---|---|---|---|
| 7,619,784 B1* | 11/2009 | O'Sullivan et al. | 358/474 |
| 8,301,653 B2* | 10/2012 | Adamousky et al. | 707/769 |
| 8,843,493 B1* | 9/2014 | Liao et al. | 707/737 |
| 9,069,732 B2* | 6/2015 | Le Chevalier et al. | 1/1 |
| 2004/0234169 A1* | 11/2004 | Tojo | 382/305 |
| 2010/0202698 A1* | 8/2010 | Schmidtler et al. | 382/195 |
| 2011/0205370 A1* | 8/2011 | Griffin et al. | 348/207.1 |
| 2012/0246343 A1* | 9/2012 | Story et al. | 709/248 |
| 2013/0174010 A1* | 7/2013 | Le Chevalier et al. | 715/234 |
| 2013/0174011 A1* | 7/2013 | Le Chevalier et al. | 715/234 |
| 2013/0174272 A1* | 7/2013 | Chevalier et al. | 726/28 |
| 2013/0250379 A1* | 9/2013 | Rigazio et al. | 358/538 |
| 2014/0153787 A1* | 6/2014 | Schmidtler et al. | 382/112 |
| 2014/0153830 A1* | 6/2014 | Amtrup et al. | 382/190 |

* cited by examiner

*Primary Examiner* — Joshua P Lottich
(74) *Attorney, Agent, or Firm* — Lee & Hayes, PLLC

(57) ABSTRACT

Some examples include testing of software able to render a content item on a display of an electronic device. The testing may include capturing images of rendered portions of a content item and comparing the captured images with previously obtained reference images that have been verified to be correctly rendered. The testing techniques can be applied to conversion software that converts digital content items from one format to another and/or testing of the converted content items themselves. Additionally, content presentation software that displays digital content items on an electronic device, such as by interacting with rendering software, may also be tested using a similar technique.

21 Claims, 10 Drawing Sheets

TESTING CONVERSION AND RENDERING OF DIGITAL CONTENT

BACKGROUND

The continued proliferation of digital content items has led to an increase in the number and availability of such content items, as well as an increase in the number and availability of electronic devices and applications used for consuming these content items. For instance, users may consume digital content items, such as electronic books (eBooks) and other types of content items, on a large assortment of different types of electronic devices and platforms. As the number of content items and different types of devices for consuming content items continues to increase, enhancing the user experience while consuming these content items can be beneficial for both the user and the provider of such content items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
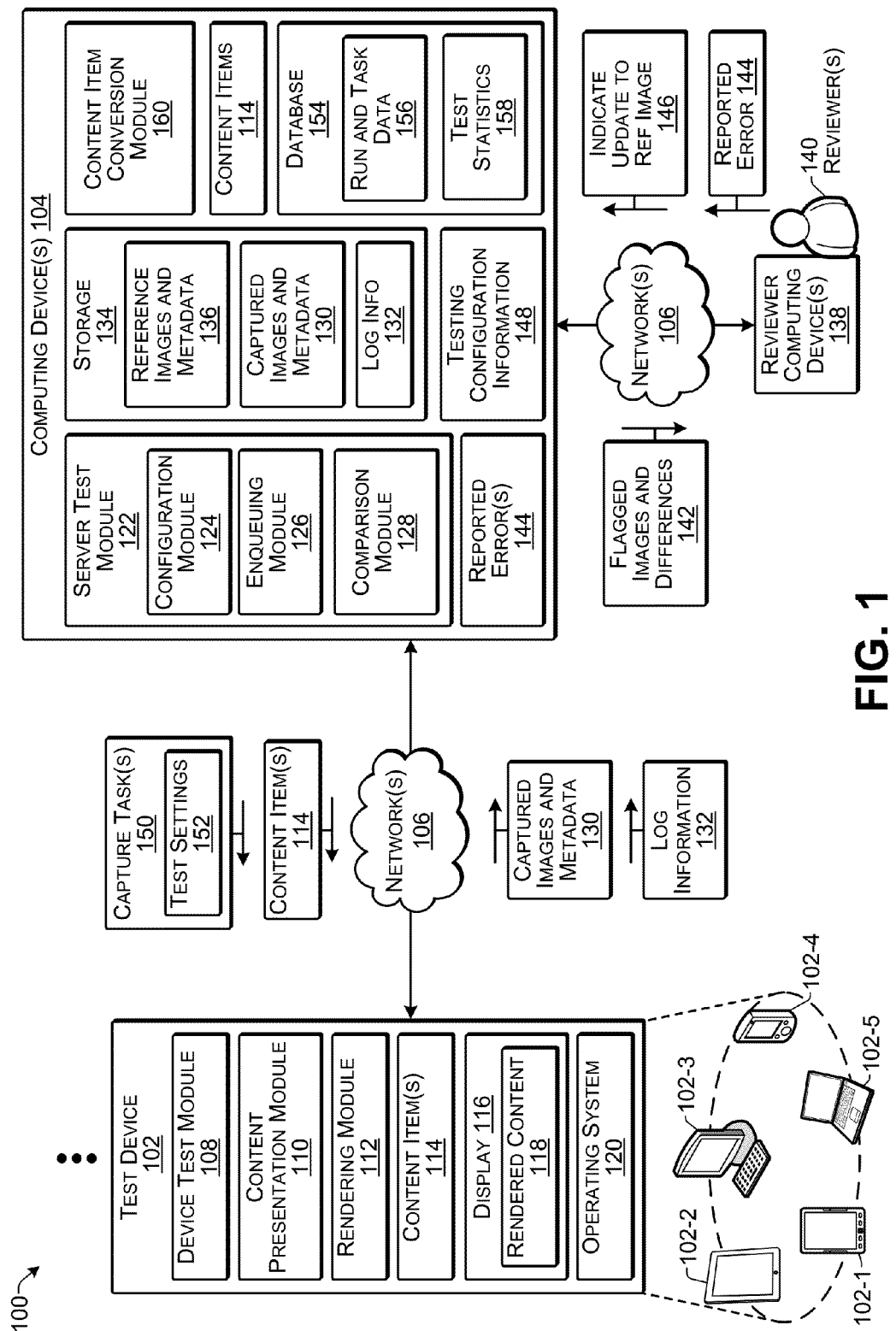
FIG. 1 illustrates an example system for performing testing according to some implementations.

Some implementations herein include techniques and arrangements for testing software able to render a content item on an electronic device. The testing techniques herein can further be applied to testing of conversion software that converts digital content items from one format to another and/or testing of the converted content items themselves. The testing techniques herein can further be applied to testing of content presentation software that displays digital content items, such as by interacting with rendering software. In examples herein, rendering may include generating displayable content, such as an image, from digital information corresponding to a content item. Rendering may also include enabling or generating other features with the content of a content item, such as user interface features that can be used to interact with the content.

According to some implementations, testing of software for rendering digital content on various different platforms and devices can be performed to ensure that the digital content will render in an expected manner during consumption of the digital content by a consumer. For example, testing of software and content items may be performed on various different operating system platforms including Android®, Windows®, Mac OS (e.g., OS X®), iOS® and Linux®. As one example, testing may verify that the rendering software performs as intended when interacting with various combinations of digital content items, operating system software and types of devices, as well as with a large array of possible settings, such as different font types, font sizes, text colors, background colors, line spacing, margin sizes, and so forth. Such testing can enhance user experience and satisfaction by detecting in advance possible rendering errors or issues, such as crashes, freezes, delays, repeated looping of pages, missing content, or improperly rendered content, such as improperly rendered text, fonts, colors, backgrounds, layouts, images, illustrations, multimedia content, or the like.

In some examples, a device-side test module may be executed, at least in part, on a test device, such as a tablet computing device, a mobile communication device, a personal computing device, or other electronic device that can be used to consume digital content items. The device test module may cause the test device to navigate through a content item in a manner similar to how a consumer would typically navigate, e.g., sequentially from start to finish, one page at a time. The device test module may check for or gather information related to various types of errors, such as crashes (e.g., the presentation software closes), freezes (e.g., additional pages will not render), long render times for a page or portion of a page, or loops (e.g., the same page is repeatedly displayed).

Further, the device test module may gather data indicative of processing performance and memory consumption during typical rendering scenarios (e.g., opening a book, turning a page) for various devices and platforms. For example, if the testing determines that a particular page of a content item took a long time to render, e.g., longer than a threshold amount of time, the particular page may be flagged, and the rendering time may be addressed. As one example, if the long rendering time was due to the presence of vector graphics or other elements on the particular page that demanded a large amount of processing and/or memory to render, the particular page, or the vector graphic portions of the page, may be flattened in advance by converting to a jpeg, bitmap, or the like. The content item having the flatten page may be provided to devices or platforms that used more than the threshold time to render the particular page during the testing. Further, if the testing shows that some devices are unable to render certain content items at a desired level of quality or within a specified time, those certain content items might not be made available to the underperforming devices, or might be offered in a down-scaled format, etc. Thus, in some aspects, the testing may determine which devices and platforms can present performance-intensive content items, and which devices may be able to present only less resource-demanding content items.

In some examples, during testing, the device test module captures or obtains images of each page rendered on the test device during the testing. The device test module may send these captured images to a storage location, such as at a local computing device, a remote computing device, a cloud storage location on a network, or the like. The captured images may be subsequently compared to reference images previously verified to have been correctly rendered. Various different techniques may be used to compare the captured images with the reference images, as discussed additionally below. If a captured image does not match a corresponding reference image within a specified threshold during the comparison, the captured image may be sent to a human reviewer for further review. In some cases, a failure to match may be indicative of a problem with the software (e.g., updated rendering software or updated presentation software) that is being tested. In other cases, the failure of the images to match each other may indicate that the newly captured image has been rendered in an improved manner (e.g., due to an update in rendering software that improves rendering). In this case, the human reviewer may replace the previous reference image with the captured image as a new reference image.

The device test module may be executed on large variety of test devices, such as various different types of electronic devices, different models of electronic devices, and/or electronic devices running various different operating systems. Further, the tests may be repeated on each of the devices for a large variety of different settings, such as different fonts, font sizes, backgrounds etc. Furthermore, the testing may be performed on each of the test devices using a large number of different content items such as from a canonical test set. Additionally or alternatively, the testing may be performed on other sets of content items such as a current top 100 most popular books across one or more marketplaces, or the like. In some examples, the settings to be used during testing can be selected based on a priority established from metrics collected from actual consumer devices. For example, if the collected consumer device metrics indicate a majority of consumers use a particular font type, font size, or the like, these settings can be given a higher weighting or priority for testing before conducting testing on less commonly used settings.

In some cases, the testing may be carried out on specific types of electronic devices configured with specific operating system and software configurations, while in other cases, the testing may be performed on one or more general purpose computers configured to emulate various types of electronic devices, various types of operating system platforms, various types of software configurations, applications, or the like. In some examples, the testing techniques herein may be applied for testing rendering software such as prior to release of an update to the rendering software that is to be used on various different types of electronic devices and platforms for rendering content items. Additionally or alternatively, the techniques herein may be used for testing presentation software, such as a reader application, or the like, that interacts with the rendering software to present rendered content on a display of an electronic device. Additionally or alternatively, the techniques herein may be used for testing conversion software such as software used to convert a digital content item from a first file format to a second file format, as well as testing the converted content item itself. As one example, in the case that the digital content item is an electronic book, the conversion software may convert the electronic book from an older format to a newer format, or from a format useable on one type of device to a format usable on a different type of device, e.g., from a Mobipocket™ format to a Kindle® format, or the like. Further, for verifying a converted content item, rather than using human reviewers to create a set of reference images for many or all possible settings, a text comparison may be made, such as a word-by-word comparison or a glyph-by-glyph comparison between a first version of the content item and a newly converted version of the content item.

For discussion purposes, some example implementations are described in the environment of testing software, such as rendering software, presentation software and/or conversion software in relation to content items, as well as testing converted content items, such as electronic books. However, implementations herein are not limited to the particular examples provided, and may be extended to other types of software, other types of content items, and other types of electronic devices, as will be apparent to those of skill in the art in light of the disclosure herein.

FIG. 1 illustrates an example system 100 according to some implementations. In this example, a test device 102 is able to communicate with one or more computing devices 104 over one or more networks 106. The test device 102 may be implemented as any of a number of different types of electronic devices. Some examples of the test device 102 may include digital media devices and eBook readers 102-1; tablet computing devices 102-2; desktop or workstation computing devices 102-3; smart phones and mobile communication devices 102-4; laptop and netbook computing devices 102-5; as well as various other different types of electronic devices examples of which may include wearable computing devices or glasses, augmented reality devices, gaming systems, televisions, and any other electronic device capable of rendering and presenting digital content items according to the techniques described herein. In some examples, such as in the case of a tablet or eBook reader, the test device 102 may be connected to a local computing device, such as a personal computer (PC) or the like (not shown in FIG. 1) that communicates with the one or more computing devices 104. In other cases, such as in the situation in which the test device 102 is itself a PC, an additional local computing device might not be used. Further, in still other examples, the test device 102 can be configured to communicate directly with the one or more computing devices 104 without a local computing device regardless of the type of test device. In some cases, a large number of test devices 102 of various different types and configurations may operate currently for testing various software updates, newly converted content items, and the like, such as for quality assurance testing and validation. Additionally, in some examples, the text device 102 may be a general purpose computing device that is configured to function as a test device. For example, the computing device may be configured to emulate a different electronic device, such as a tablet, and may include one or more software-based emulators that can emulate hardware or software functionalities. As one example, the computing device may be configured with a content presentation module emulator, or the like, for determining functionality of rendering software with a particular configuration emulated by the computing device.

The test device 102 may include a device test module 108 that is executable on the test device 102 for performing at least a portion of the testing described herein. For instance, the test device 102 may include a content presentation module 110 and a rendering module 112 that may be operated on the test device 102 by the device test module 108. To illustrate, the device test module 108 may cause the content presentation module 110 to open a content item 114 on the test device 102. To display a first page of the content item 114 on a display 116 of the test device 102, the content presentation module 110 may invoke the rendering module 112 to render a portion of the content item 114 as rendered content 118 on the display 116.

As one example, the content presentation module 110 may interact with the rendering module 112 through a call to one or more application programming interfaces (APIs) of the rendering module 112. In response, the rendering module 112 may render a specified page of the content item 114 specified by the call from the content presentation module 110. The rendered content 118 may be presented on the display 116 by the content presentation module 110. Furthermore, while the rendering module 112 is described as a separate abstraction in this example, in other examples, the rendering module 112 may be part of the content presentation module 110 or may be interacted with by the content presentation module 110 using techniques other than a call to an API.

In some implementations, the content item 114 may be an electronic book (eBook) having one or more pages of text. For example, the display 116 may display the text of the eBook and also any illustrations, tables, maps, or graphic elements that might be contained in the eBook. The terms "electronic book" and/or "eBook," as used herein, include electronic or digital representations of printed works, as well as digital content that may include text, multimedia, hypertext, and/or hypermedia. Examples of content items 114 include, but are not limited to, digital representations of books, magazines, newspapers, periodicals, journals, reference materials, textbooks, anthologies, instruction manuals, proceedings of meetings, forms, directories, plays, screen plays, closed captioning transcripts of movies and television shows, song lyrics, webpage content, and so forth. Accordingly, the content items 114 herein may include any readable or viewable textual content that is in electronic or digital form. Additionally, some implementations herein are not limited to text items, but may also include other types of content items 114, such as digital audio (e.g., music, audio books, etc.), digital video (e.g., movies, television, short clips, etc.), images (e.g., art, photographs, etc.), and multi-media content.

The test device 102 further includes an operating system 120, which may be any suitable operating system, the type of which may be dependent at least in part upon the type of the test device 102 being used for the testing. Examples of operating systems according to some implementations herein may include various different operating systems including Android®, Windows®, Mac OS (e.g., OS X®), iOS® and Linux®. Accordingly, the testing techniques herein may be conducted on various different types of devices having different hardware configurations, and various different types of operating system platforms to ensure consistent rendering and presentation of content items 114 across the various different devices and platforms.

The one or more networks 106 may include a local area network (LAN), a wide area network (WAN), such as the Internet, or any combination thereof, and may include both wired and/or wireless communication technologies, including cellular communication technologies as well as wired or fiber optic technologies. The one or more computing devices 104 and the test device 102 may communicate and interact with one another using any combination of suitable communication and networking protocols, such as Internet protocol (IP), transmission control protocol (TCP), hypertext transfer protocol (HTTP), cellular communication protocols, and so forth.

In some examples, the one or more computing devices 104 may include, at least in part, a cloud-based computing service and/or cloud-based storage. For instance, the one or more computing devices 104 may include one or more servers located at one or more data center, a server farm, data storage arrays, storage area networks, or the like, for providing computing and data storage services. In other examples, the one or more computing devices 104 may be one or more computing devices that are directly connected to the test device(s) 102 and/or at the same location.

The one or more computing devices 104 may include a server test module 122 that may be executed on the one or more computing devices 104 for performing a portion of the testing techniques described herein. For example, the server test module 122 may interact with the device test module 108 such as for providing testing task instructions, test configurations and/or content items for conducting the testing. In the illustrated example, the server test module 122 includes a configuration module 124 that may serve as a configuration editor for determining and providing configuration instructions that may be used to configure the test devices 102 for performing the testing. In addition, the server test module 122 may include an enqueuing module 126 that may be executed for specifying, based on the configuration information, one or more test tasks to be performed by the test devices 102, and for specifying one or more content items 114 to used during the testing.

Additionally, the server test module 122 may include a comparison module 128 that may be executed for comparing captured images captured during the testing with reference images previously obtained and verified to be correct. For example, as discussed above, the device test module 108 on the test device 102 operates the content presentation module 110 to render and present portions of a content item 114 on the test device 102. As one example, the device test module 108 may progress through the content item 114 in a sequential manner, such as by starting at the cover of the content item and sequentially displaying each next page of the content item until the end of the content item is reached. As each page of the content item is displayed, the device test module 108 may capture a screenshot or may use any other suitable technique to obtain an image of the rendered content 120 presented on the display 116. The device test module 108 may store the captured image of the page along with metadata associated with displaying the page, such as the device type, operating system, display resolution, how long the page took to render, the current settings for the page, such as font size, font style, background color, and so forth. Captured images and metadata 130 may be sent to the one or more computing devices 104 for storage. In some examples, the captured images and metadata 130 may be sent in real time or near-real time, as the images are obtained during testing. In other examples, the captured images and metadata 130 may be sent in a batch, such as when a specified number of pages have been rendered, when the end of the content item is reached, when a specified number of content items have been rendered, when a predetermined amount of storage capacity has been used up on the test device 102, or at any other suitable juncture.

In addition to the captured images and metadata 130, the device test module 108 may also send log information 132 to the one or more computing devices 104. For example, the log information 132 may indicate overall results for each test conducted for each content item 114. For example, testing for each content item may include testing the rendering of the content item 114 multiple different times, such as using a different setting during each different test. In some cases, hundreds of different presentation setting combinations may be tested on each test device 102 for each content item in a set of content items. For instance, a large number of tests may be run on each test device 102 for each content item 114 in a canonical test set of content items. Thus, the log information 132 may indicate whether a crash or other render error occurred during any of the tests, the total time for conducting each test, the settings in effect during each test, an identification of the content item tested, the file format of the content item tested, the type, model and/or brand of the test device, the operating system type and version installed on the test device, the version of the rendering module tested, the version of the content presentation module used during the test, and so forth.

Captured images and metadata 130 and the log information 132 may be stored in storage 134 associated with, or able to be accessed by, the one or more computing devices 104. As mentioned above, in some examples the storage 134 may be a cloud storage location, while in other examples, the storage 134 may be a local storage of the one or more computing devices 104. Consequently, the storage 134 may be any suitable computer-readable media that can be used to store the received images and data, and be accessed by the one or more computing devices 104.

As mentioned above, the storage 134 may further include reference images and associated metadata 136 that have been previously obtained and verified to be correctly rendered. For example, during an initial testing setup stage, the reference images 136 may be generated using a first version of the rendering module 112 on a test device 102. Thus, during the testing setup stage, for each content item 114 in the test set of content items, tests may be run on the test devices 102 using the first version of the rendering module 112 for some or all of the possible different settings. The captured images obtained during this testing setup stage are sent to reviewer computing devices 138, such as over the one or more networks 106, and are manually reviewed by human reviewers 140 who check to ensure that each page is correctly rendered. For example, a human reviewer may scrutinize each page to determine that the text and any images are properly rendered, legible, formatted according to the settings of the presentation application, and so forth. After the human reviewers 140 have verified that the images are correctly rendered, these images are stored along with their metadata as the reference images and metadata 136. Further, some examples, the verification of the reference images may be wholly or partially performed by a computing device. For instance, new reference images may be verified using the image comparison techniques herein for by comparison with previously-verified reference images. As another example, an algorithm may be executed for verifying a particular image as a reference image, such as by performing optical character recognition on the reference image to generate electronic text, comparing the electronic text with known correct text such as from an original print book, an original electronic text file from the publisher, or from another suitable source, in combination with various other automated techniques for checking margins, page layout, background configuration, and so forth.

In some examples, the metadata associated with each reference image, or with a set of reference images, may indicate, using any suitable technique, that the reference images have been verified to have rendered correctly. In some examples, the storage of the images in a particular location may indicate that the images have been verified. In other examples, the image metadata may be flagged or may include some other indicator to signify that the images have been verified and can be used as reference images. The metadata may further indicate the test device used to generate each reference image or set of reference images, the rendering software version, the presentation application version, the operating system used, the device settings and presentation application settings used to generate the images, the date the images were rendered, the date the images were verified, the identity of the reviewer that verified the images to have rendered correctly, and so forth.

Subsequently, when a new second version of the rendering module 112 is to be released, the second version may be tested and validated prior to the release using the testing techniques described herein. For each content item 114 in the test set, the tests may be run again on the same test devices 102, or on test devices having a configuration that corresponds to the original test devices 102 (e.g., same type of device, same operating system, same presentation settings, etc.), but with the second version of the rendering module 112 installed on the test devices 102. The captured images 130 from the tests are compared with the reference images 136 obtained on the same test device(s) 102 (or the same type of test device 102 having the corresponding configuration) and using the same presentation settings for the same content items 114. As mentioned above, the presentation settings depend at least in part on the setting options offered by the presentation module 110, and may include setting the presentation module for presenting the content item with, e.g., the same font style, same font size, same font color, same background settings, same line spacing, same margins, and so forth.

The comparison between the captured images 130 and the reference images 136 may be performed by the comparison module 128 using any suitable techniques or combination of image comparison techniques. As one example, the images to be compared with one another may each be expressed as one or more histograms, and the corresponding histograms from each image may be compared with one another to determine whether there are substantial differences between the images being compared. In some examples, the images may first be scaled to the same size and resolution, and may be otherwise normalized with one another. Further, the number of colors in the images may be reduced, e.g., to 256 colors, or alternatively, the images may be converted to gray-scale images, before generating the respective histograms, which can simplify the comparison. In some cases, the respective histograms are generated, such as based on pixel intensities using a plurality of discrete bins, and the top color intensities of the histograms may be compared to determine the differences between the two images. A tolerance or threshold of difference may be established such that when the difference between the two images exceeds a threshold amount, the comparison module 128 may flag the captured image for being reviewed by a human reviewer 140. Flagging an image may include any suitable technique for indicating that the image does not match the reference image. Flagging may further include indicating that the image is to be reviewed. As one example, an identifier of the image may be added to a list of flagged images. Further, while histogram comparison is described as one example for comparing similarity between two images, other techniques may also be used, such as edge detection, or the like.

Flagged images and differences 142 may be sent to the reviewer computing devices 138 for review by the human reviewers 140. As one example, a reviewer may access flagged images through a webpage or other user interface to display the flagged images on the reviewer computing device 138. In some cases, the flagged image 142 may be improperly rendered, which may indicate a bug or error in the second version of the rendering software being tested. In this situation, the human reviewer 140 may confirm that the flagged image is not correctly rendered, and may provide a reported error 144. The reported error(s) 144 may be passed to the appropriate development team or test operator so that measures may be taken to fix the error in the software currently being tested.

In other cases, the flagged image may be properly rendered, but may still be different from the reference image. For example, if the second version of the rendering module 112 provides images that are improved over the images rendered by the previous version of the rendering module 112, then the human reviewer 140 may determine that the flagged image rendered correctly and the difference is due to the improvement. The human reviewer 140 may then provide an indication 146 that the flagged image should be promoted to become the new reference image, and the new reference image and associated metadata may replace the prior version of the reference image in the reference images and metadata 136 for the particular test device, content item, settings, etc. In some examples, the entire set of new images is promoted, following verification of the entire set by one or more reviewers, rather than permitting isolated instances of images to be promoted to being reference images.

As mentioned above, the configuration module 124 may be executed to provide a configuration editor. For example, a human operator on a PC or other computing device may operate the configuration module 124 to configure XML (extensible markup language) instructions or schema for configuring the test devices 102 to perform desired testing. For instance, the configuration module 124 may specify the content items 114 to be included in the testing, the test devices 102 and operating system platforms be included in the testing, the version of software to be included in the testing, the settings to be tested on each test device 102, and so forth. This information may be provided as testing configuration information 148.

In some examples, the enqueuing module 126 may be executed to specify testing tasks 150 for particular test devices 102 based on the testing configuration information 148 to the enqueuing module 126. For example, the enqueuing module 126 may specify a testing capture task 150 that is sent to each device test module 108 on individual ones of the test devices 102. Each instance of the capture tasks 150 may be tailored for the particular type and platform of the respective test devices 102, including various different test settings 152 to be applied during each successive test. Thus, the enqueuing module 126 may set up queues of content items 114 and capture tasks 150 for testing on each test device 102. The testing tasks 150 and corresponding content items may be provided to the test devices 102 using any suitable technique such as by sending over the one or more networks 106. Furthermore, information on the capture tasks 150 and associated configuration information 148 may be stored in a relational database 154 as run and task data 156. This information may be related in the database 154 to test statistics 158 provided by the device test modules 108 following execution of the corresponding capture tasks 150, such as may be obtained from the log information 132 or other information collected by the device test module 108 during the testing.

As mentioned above, the testing techniques herein are not limited to testing of updates to the rendering module 112. For instance, other types of software used for generating or presenting content items 114 may be tested in a similar manner. As several examples, updated versions of the content presentation module 110 and/or updated versions of a content item conversion module 160 may be similarly tested using the techniques described herein. According to some implementations, the content presentation module 110 may be an application that runs on the various different electronic devices to present the content items 114 to the user. Thus, the content presentation module 110 may be different for each different operating system platform with which it will interact. The content presentation module 110 may employ the rendering module 112 when presenting a content item on an electronic device for viewing by a consumer. Accordingly, testing of the content presentation module 110 and its interaction with the rendering module 112 may be performed to ensure that the content is correctly rendered and presented on various different types of electronic devices.

Similar to the example described above with respect to testing of the rendering module 112, reference images and metadata 136 may be obtained during a testing set up stage for the content presentation module 110. In some examples, the reference images and metadata 136 may be the same as those obtained for testing the rendering module 112 while in other examples, a separate set of reference images and metadata 136 may be created for use in testing the content presentation module 110. Subsequently, when updates are made to the content presentation module 110, the updated content presentation module may be tested on the various test devices 102 in a manner similar to that described above for testing of updates to the rendering module 112. Typically, updates to the content presentation module 110 may be tested separately from updates to the rendering module 112 so that any errors in rendering can be isolated to either the updated presentation module 110 or the updated rendering module 112. Accordingly, by applying the techniques herein updates to the content presentation module 110 may be fully tested and vetted prior to release of the updates to the electronic devices of customers.

As another example, the content item conversion module 160 may be tested using similar techniques to those described above. As mentioned previously, electronic books may be created in a variety of electronic book formats. These formats may be occasionally updated, or a new file format may be introduced. Consequently, following conversion of a content item 114 from a first file format to a second file format, captured images of the content item in the second format may be compared with verified reference images of the content item 114 in the first file format using the techniques herein to detect any errors with the content item or the conversion module 160 that was used to convert the content item 114 from the first format to the second format.

Additionally, in some cases, the content items may be tested during initial ingestion, i.e., following receipt from an author or publisher and conversion from their original file format into a desired electronic book format. For example, suppose a publisher or author provides a newly authored content item 114 to the one or more computing devices 104. The content item 114 may be converted by the conversion module 160 to one or more preferred file formats for use with the content presentation module 110 and the rendering module 112 on the various test devices 102. Because there are not any existing reference images for verifying the converted content item 114, a technique other than direct image comparison may be used for verifying that the converted version of the content item 114 works properly. As one example, images of rendered pages of the converted content item 114 may be captured on the test devices 102 as described above. Subsequently, the comparison module 128 may convert the captured images to electronic text using optical character recognition (OCR). The comparison module 128 may compare the text obtained by OCR with electronic text from the original content item. For instance, the comparison may be a glyph-by-glyph comparison (i.e., comparing each character or symbol of text sequentially). Additionally, or alternatively, the comparison may be a word-by-word comparison that compares complete words of the content. If the text matches that of the originally-provided content item, the converted version of the content item may be validated. On the other hand, if the text does not match the originally provided content item, such as beyond a threshold amount to allow for errors in the OCR, this may be indicative of an error in the conversion software. Further, in some examples, such as in the case in which the content item is a self-published book that was converted by the author during a self-publishing conversion step, feedback may be provided to the author regarding specific issues on specific devices that may arise if the author submits the tested book in its current form. Numerous other applications for the testing techniques described herein will be apparent to those of skill in the art having the benefit of the disclosure herein.

Figure 2:
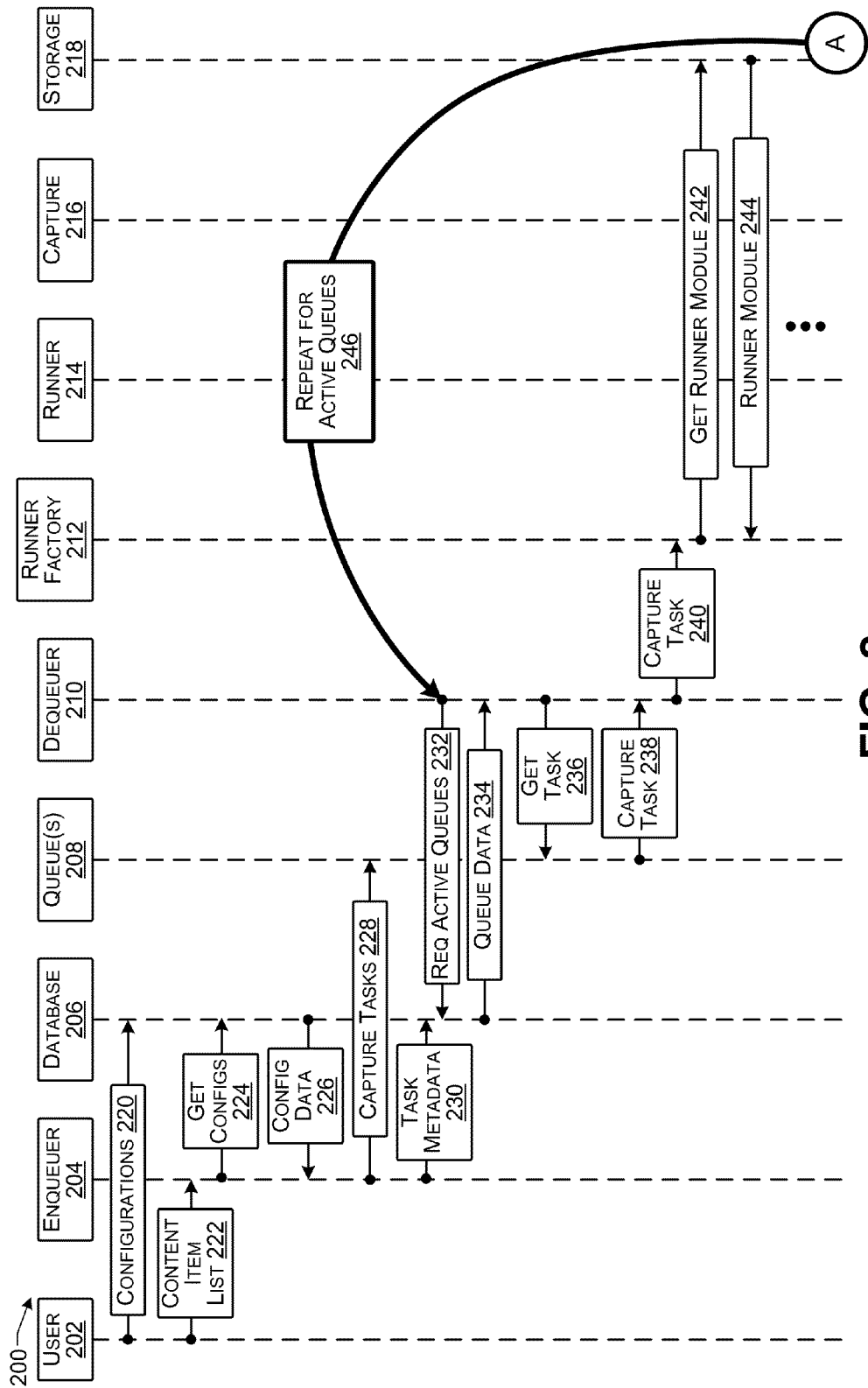
FIG. 2 illustrates a first part of an example process flow for performing testing according to some implementations.
Figure 3:
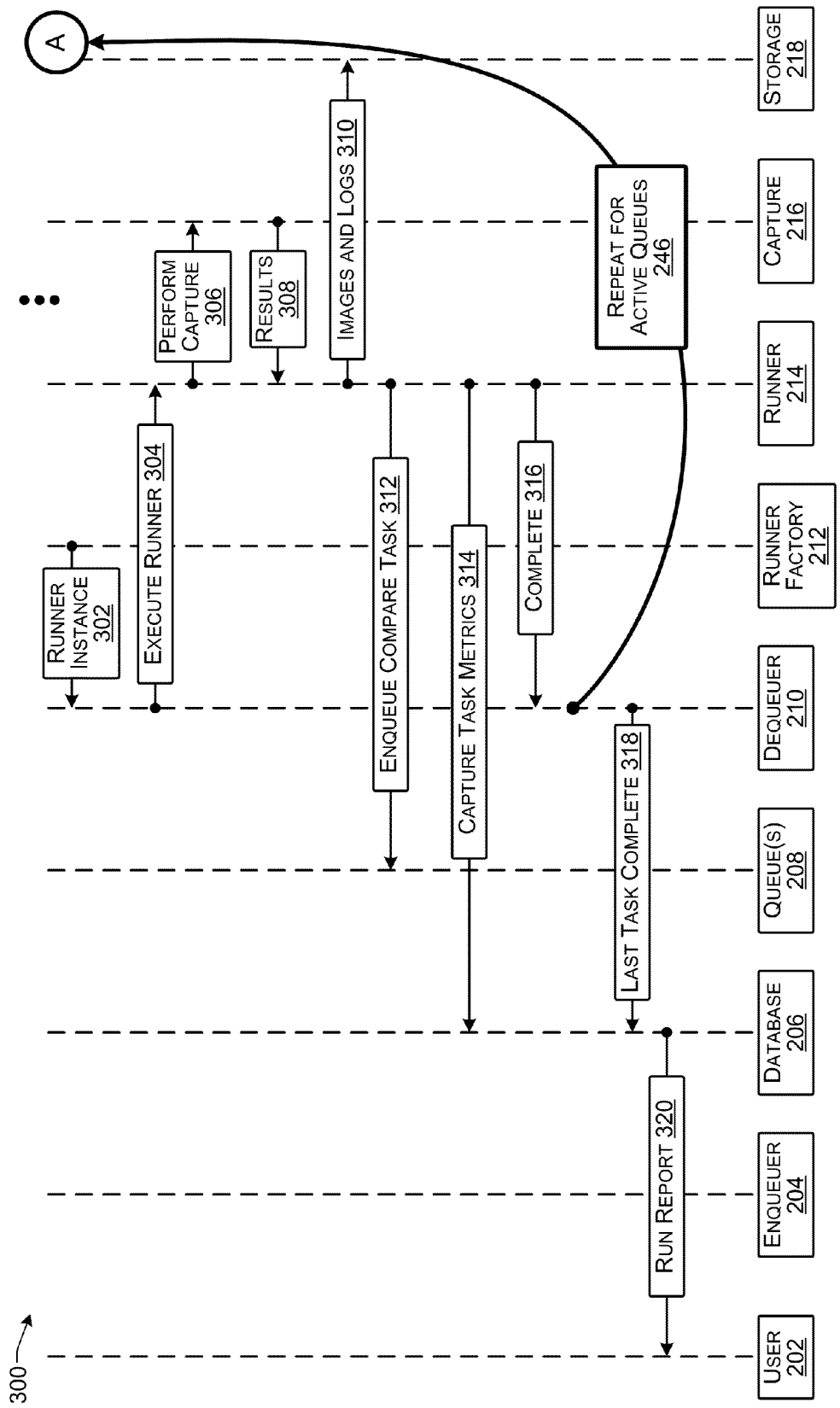
FIG. 3 illustrates a second part of the example process flow for performing testing according to some implementations.

FIGS. 2 and 3 illustrate respective first and second parts of an example process flow diagram according to some implementations. The example flow diagram of FIGS. 2 and 3 depicts the processing carried out for testing rendering software or for performing other types of testing according to the implementations herein. In the example of FIG. 2, a first part 200 of the processing framework includes a user 202, enqueuer 204, database 206, queue 208, dequeuer 210, runner factory 212, runner 214, capture 216 and storage 218. At 220, the user 202 may add configurations as a group to the database 206, such as via XML code, or may select a previously created group of configurations. For instance, the configuration module 124 discussed above may include an "AddConfiguration" feature able to parse XML and find a name for a group of configurations to be use in running a test. Each configuration from the group of configurations may be parsed and validated for use as a testing configuration.

The user may further provide or identify a content item list 222 that identifies one or more content items that will be used during the testing. In some examples, the content item list 222 may include content items from a canonical set of content items used as a test set, some of which may be in English or other Latin-character based languages, others of which may be in Japanese, others of which may be in Chinese, and/or others of which may be in other desired language types/character types. For instance, the test set of content items may have been previously used to create a set of reference images. In some examples, the content item list 222 may additionally, or alternatively, include the current top 100 best selling content items in one or more markets. For instance, because these content items may be consumed by a large number of customers, more extensive testing may be performed using these content items to ensure a superior user experience for a maximum number of customers.

A capture task may then be created to run the desired test for capturing rendered images rendered on one or more test devices. This may be performed using a "createRun( )" procedure that takes in information about the test run, including identification of the software version being tested, the user, the target platform to be tested and a run description. Each new test run may receive an individually distinguishable identifier, which may be used for tracking the testing and the results. Thus, when starting a test run, the user 202 may specify the configuration group at 220. The enqueuing module 126 discussed above with respect to FIG. 1 may include the enqueuer 204, which, as illustrated at 224 retrieves configuration data 226 for each configuration in the specified configuration group from the database 206. The enqueuer 204 then uses the configuration data 226 to create one or more capture tasks 228, which may, for example, be expressed in XML or other suitable code. The enqueuer 204 may further add task metadata 230 to the specified configurations in the database 206. The list of content items 222 for the test run may also be parsed and saved to the database 206 and may be added to the retrieved configuration data 226. The capture tasks 228 may then be serialized, such as to XML, and added to the queue 208 as one or more pending test tasks. In some cases, after queuing all of the capture tasks 228 corresponding to the configurations 220 specified by the user 202, the capture tasks 228 may also be added to the database 206 as a group to avoid excessive connections and insertions to the database 206.

In some examples herein corresponding to executing capture tasks on test devices, the dequeuer 210, the runner factory 212, and the runner 214 may correspond to a portion of the device test module 108 executed on the test device 102 or executed on an associated host computing device, which may obtain and run a capture task. As indicated at 232, the dequeuer 210 may request a list of active queues from the database 206. The database 206 may provide queue data 234 including the list of active queues. The dequeuer 210 may check, in order, each queue in the list of active queues to locate a capture task 238 to be performed by the test device. For example, code specifying the task parameters, such as XML code, may be passed to the test device. As indicated at 240, the capture task may be passed to the runner factory 212 and a new instance of a runner 214 is created for executing the capture task. For instance, the runner factory 212 may be a piece of code of the device test module 108 that may be executed, as indicated at 242, in response to receiving the capture task 228, to initiate a runner module 244 that will execute the capture task 228. In some examples, the runner module 244 is in storage on the test device. In other examples, the runner module 244 may be retrieved from a network storage location. Additional processing is described further with respect to FIG. 3 below. Furthermore, as indicated at 246, and as discussed additionally below when the capture task is complete, the dequeuer 210 may check the active queues for additional capture tasks to be executed. When a queue has no more tasks, the queue will be removed from the list of active queues and the database 206 is updated.

FIG. 3 illustrates the second part 300 of the process flow according to some implementations. Following retrieval of the runner module 244, a runner module instance 302 is implemented for executing the capture task. As indicated at 304, when executing the capture task, the runner performs capture 306 of images and obtains results 308. For example, the runner may cause pages of a content item to be rendered sequentially on a test device using settings and a content item specified by the capture task. Further, the runner may capture and save images and logs to storage 218, as indicated at 310. In some cases, the storage 218 may initially be a local storage, while in other examples, the storage 218 may be a network storage location. In either case, eventually the runner may upload the images, logs, and other output, such as image metadata to a network location corresponding to the particular capture task. In some examples, upon completing the capture task, the runner 214 can also enqueue a corresponding compare task to a compare queue, as indicated at 312. In addition, task metrics 314 collected regarding the capture task, such as task start time, completion time, and various other information related to execution of the capture task, may be provided to the database 206. For instance, during the processing, the code may log messages about results and status, which may be used to report on task progress and report the end results. In some cases, a message may be sent when certain events occur, such as dequeuing a task, or completing a capture, and the message may be recorded into the database 206 for the task that caused the message to be sent. Upon completion, as indicated at 316, the completed capture task may be removed from its queue and dequeuer 210 may check for active queues to repeat the capture task processing for a next task, as indicated at 246 and the associated arrow, which returns to FIG. 2. Alternatively, as indicated at 318, when the last task has been completed, the database 206 may run a report 320 on the completed task(s), and provide the report to the user 202. In some cases, the report may comprise a results email including a summary of statistics associated with the executed tasks and a link to output corresponding to the test run.

In addition, while not illustrated in FIGS. 2 and 3, a compare task may be executed in a similar manner for comparing the captured images with corresponding reference images. For purposes of executing the compare task, the dequeuer 210, the runner factory 212 and the runner 214 may all correspond to portions of the comparison module 128 discussed above with respect to FIG. 1, and thus, may be executed on the one or more computing devices 104. The compare task may be dequeued in a manner similar to that discussed above for the capture task, such as using an ordered list of queues. For each compare task, a runner is obtained and the runner executes the compare task by getting the reference images and the new capture images from storage. The runner may initially run a comparison of the reference images file set and new image file set and, if the number of images in each file set do not match, then no other work is done and an error is reported. If the image counts do match, then the runner may run an image difference comparison between image pairs comprising corresponding ones of the reference images and the newly captured images that include or should include common content. In some examples, a Python® Image Library (PIL) may be used to determine a difference between the two images in each image pair of corresponding images. If differences outside a threshold tolerance are detected, then the reference image, the newly captured test image and the difference may be saved for subsequent manual review and/or analysis. In some cases, the comparison technique may include the ability to ignore certain regions of the images, as these regions may change from run to run. As one example, this may be added to the compare task's XML specification. Further, in some cases, the comparison module may be configured to detect perceptual image differences that can take into account how the human eye perceives the rendered data.

In some examples, as discussed additionally below, a user that initiated the testing, or a reviewer, may be able to access particular images through a queryable webpage that may allow access to some or all of the image sets, i.e., reference images, captured test images and any differences detected by the comparison module. For instance, to view the images or image differences of a run, a link may be provided with a results report email or other communication, as well being searchable from a webpage or other suitable user interface.

Figure 4:
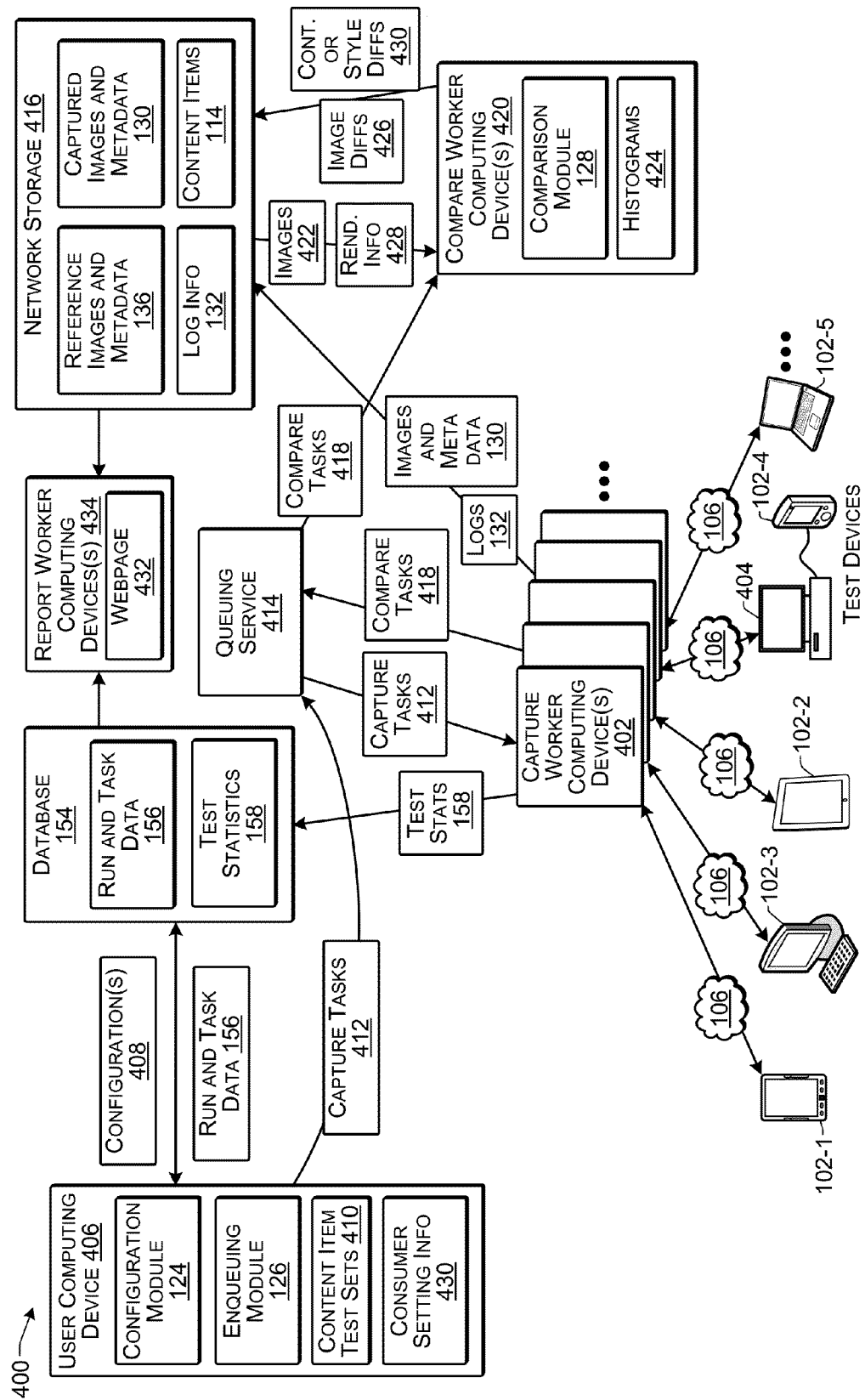
FIG. 4 illustrates an example system including a queuing service for performing testing according to some implementations.

FIG. 4 illustrates an example system 400 that includes a queuing service for performing testing according to some implementations. In this example, cloud-based computing services may be leveraged to provide the computing and storage requirements for implementing the testing techniques described herein. Examples of suitable computing services may include Amazon Elastic Compute Cloud (EC2), which can provide processing resources, and Amazon Simple Storage Service (S3), which can provide network-based storage, although any other suitable cloud-based computing services and/or storage services may be employed.

In the illustrated example, one or more capture worker computing devices (capture workers) 402 may be provided by the computing service, such as for interacting with individual test devices 102 over the one or more networks 106. In some cases, there may be a one-to-one relationship between capture workers 402 and the test devices 102. In other examples, individual ones of the capture workers 402 may be configured for interacting with test devices running a particular type of operating system. For example, a first capture worker 402 may be configured for interacting with Windows®-based test devices, while a second capture worker 402 may be configured for interacting with Android®-based test devices, and so forth. Furthermore, some capture workers 402 may be configured differently from others for interacting with different types of test devices. For instance, a capture worker 402 that interacts with a tablet running a capture task may be configured to receive captured images as the images are captured due to lower storage capacity on the tablet computing device, whereas a capture worker 402 that interacts with a PC running a capture task may be configured to receive the captured images as a batch due to the higher storage capacity of the PC.

Further, in some examples, as mentioned above, a host computing device 404 may act as a local intermediary for some types of test device, such as mobile devices 102-4. For instance, the host computing device 404 may include a device test driver or other executable code as part of the device test module 108. For instance, the device test driver may operates the presentation module 110 on the mobile device 102-4, configure the presentation module 110 to desired settings for performing a particular capture task, and cause the presentation module 110 to sequentially render pages of a content item, such as by employing a rendering module 112, as discussed above. The device test driver may further capture screen shots of each rendered page, and may send the captured images and corresponding metadata 130 to an associated capture worker 402 for storage at a network storage location.

The system 400 may further include a user computing device 406 which was not illustrated separately in the example of FIG. 1, but which may also be included in the system of FIG. 1. In this example, the configuration module 124 and/or the enqueuing module 126 may be executed by the user computing device 406. For example, as discussed above with respect to FIG. 2, the user computing device 406 may generate or select one or more configurations 408 for testing using the configuration module 124. The enqueuing module 126 may generate run and task data 156 based on the configuration(s) 408 and based on one or more content item test sets 410 indentified by the configurations 408. Examples of content item test sets 410, as mentioned above, include a canonical test set of a plurality of content items 114 previously used to create reference images and/or the top 100 current best selling content items 114 in one or more markets. Based on the run and task data 156 the enqueuing module 126 may generate one or more capture tasks 412 for the test devices 102. The capture tasks 412 may be sent to a queuing service 414 provided by one or more computing devices of the computing service. An example of a suitable queuing service 414 is Amazon Simple Queue Service, which allows up to 64 kB of data to be passed between modules, programs or services. As one example, the capture tasks 412 may be XML blobs that include the configuration and settings for the corresponding test task. In some cases, the capture tasks 412 may be pushed to the test devices 102, or associated capture workers 402, as the test devices 102 complete previously assigned capture tasks 412.

The capture workers 402 may obtain individual capture tasks 412 from the queuing service 414, such as based on the technique discussed above with respect to FIG. 2, or through any other suitable technique. In addition, the capture workers 402 may further obtain or provide one or more content items 114 to be used by the test device 102 during execution of the respective capture task 412. The task information and the content item 114 may be provided to the corresponding test device 102 for execution of the test. In some examples, the software to be tested (e.g., in the case of testing an update to the rendering module or an update to the presentation module) may be installed on the test device 102 during this step, while in other examples, the software to be tested may have already been installed on the test device 102. Further, in still other examples, such as in the case of testing conversion software, the software is tested indirectly by testing the rendering and display of the converted content items 114 as described above.

The test devices 102 may run the assigned test capture tasks 412, and may provide captured images and metadata 130 and log information 132 to the capture worker 402. The capture workers 402 may provide the images, metadata and logs 414 to a network storage 416 that may be provided by the cloud storage service. In addition, following completion of a capture task, the corresponding capture worker 402 may generate a compare task 418 that is sent to the queuing service 414. The queuing service 414 may add the compare task 418 to an active queue for compare tasks. Each compare task 418 may include identification of the corresponding capture task and/or an indication of the network storage location at which the captured images corresponding to the respective capture task are stored. In addition, the capture worker 402 may send test statistics 158 to the database 154 for relation in the database with the run and task data 156 for the respective capture task.

The compare tasks 418 may be obtained from the queuing service 414 by one or more compare worker computing devices (compare workers) 420. The comparison module 128 may be executed by the one or more compare workers 420 for comparing the captured images 130 with the reference images 136, as discussed above. Thus, when executing the compare tasks 418, the compare worker 420 may obtain matched pairs images 422 that will be compared, i.e., a set of captured images 130 and a set of corresponding reference images 136. The compare worker 420 may first check to ensure that the reference image set and the captured image set include the same number of images. If not, no further comparison is needed, and the captured images may be flagged for review. If the number images in each set is the same, the image pairs for comparison may be determined or aligned using any suitable tracking technique. As one example, the images for comparison may be matched with one another based on sequential numbering, such as based on an order in which the images were rendered. The compare worker 420 may compare the two images in each of the pairs of corresponding images using any suitable image-comparison technique, or combination of techniques, as discussed above. As one example, the compare worker 420 may compare respective histograms 424 of the two images with each other, as discussed above. The compare worker 420 may return any detected image differences 426 and/or flag for review certain captured images that are detected to differ by a threshold amount from the corresponding reference image.

Additionally, in some examples, rather than comparing images, or in addition to comparing images, other rendering information may be compared. For instance, in addition to capturing images, or instead of capturing images, the test devices 102 may be configured to obtain and provide rendering information, such as a render tree, or rendered pages. Thus, rather than capturing an image presented on a display of the test device, the rendered image information may be sent directly from a buffer on the test device to the network storage 416. In some cases, the rendering information for a page may be in an image format, such as jpeg, bitmap, or the like, that could be used to present the image, or may be in pre-rendered format including primitives. Accordingly, during comparison, the rendering information 428 for two corresponding images or pages may be compared to ensure that the content of the test run matches with that of the reference images, and may further be compared to verify matching of style elements, such as font type, font styles, font size, border attributes, background attributes, and so forth.

As one example, rather than comparing images, the comparison module 128 may receive rendering information 428 for an original run of a reference content item and for the content item being tested. Examples of rendering information 428 may include render trees, rendering information for rendering individual pages, and so forth. The rendering information from the reference content item may be compared directly with the rendering information from the tested content item, such as for detecting content or style element differences 430. The detected content or style element differences 430 may be compared to threshold levels for particular types of differences, and the content may be flagged if the differences exceed the threshold(s).

In some cases, the nature and respective values of the thresholds may be context dependent and may be configurable at an API level. For instance, for font size and some other style elements, if the difference between the two values of the same elements is less than a particular percentage, then the comparison may be considered to pass verification. As another example, for image layouts, a threshold may be based e.g., on a difference in the percentage of the screen area that is occupied by the image. Further, for some types of style elements, such as font style (e.g., bold, italic, underline, all caps, etc.), the threshold may be strict. For example, if a word or letter is in bold text in the reference version, the word may also be required to be bold text in the test version to avoid generation of a flag.

As mentioned above, as one example, a user that initiated the testing, or a reviewer who will review image differences, may be able to access data on the network storage 416 through a webpage 432 or other suitable user interface. For example, the webpage 432 may allow access to some or all of the image sets, i.e., reference images 136, captured test images 130 and any differences 424 detected. In some examples, one or more report worker computing devices (report worker) 434 may generate and/or serve the webpage 432. To view the image differences of particular test run, the report worker 434 may provide access using any suitable technique. As one example, the report worker 434 may send a results report email or other communication that includes a link to at least one test run and results, or a link to a searchable webpage or user interface that can provide access to test runs and results. For instance, the reference images 136, captured test images 130, and image differences 424 may be presented in a web-based viewer to enable a human reviewer to either accept or reject a captured test image that has been flagged as differing by more than the threshold amount.

In some cases, the captured test images may be promoted to reference images using the viewer. Additionally in some cases, only complete content items, and not individual captured test images, can be promoted to reference images. For example, if the updated rendering software provides superior results, it is desirable that the old reference images all be replaced with the superior newly captured images, which will serve as the new set of reference images for the corresponding test configuration (i.e., device type, OS platform, presentation settings, content item, and so forth). Accordingly, implementations herein may leverage a testing infrastructure to capture and analyze large quantities of images for ensuring rendering quality and guarding against regressions when software associated with rendering of content is updated to a newer version.

In addition, in some examples, the user computing device 406 may receive or may access consumer setting information 430 that may include an indication of the most popular settings used by consumers for consuming content items on various different devices and operating system platforms. For example, the consumer setting information 430 may be collected from a large number of consumer devices, such as when receiving periodic updates for individual consumers advancing through a content item. As one example, as a consumer progresses through a content item on a consumer device, the consumer's position may be periodically communicated to a server to enable synchronization of the content item across multiple devices of the consumer. During these updates, the settings, such font size, font type, line spacing, layout, background, etc., currently in place on a particular consumer device may also be noted. Thus, the gathered consumer setting information 430 may indicate which settings are most popular with consumers, and these settings may be given a higher priority for testing than more obscure presentation settings. Accordingly, the consumer setting information 430 may be applied through the configuration module 124 when setting up configurations 408 for testing.

Figure 5:
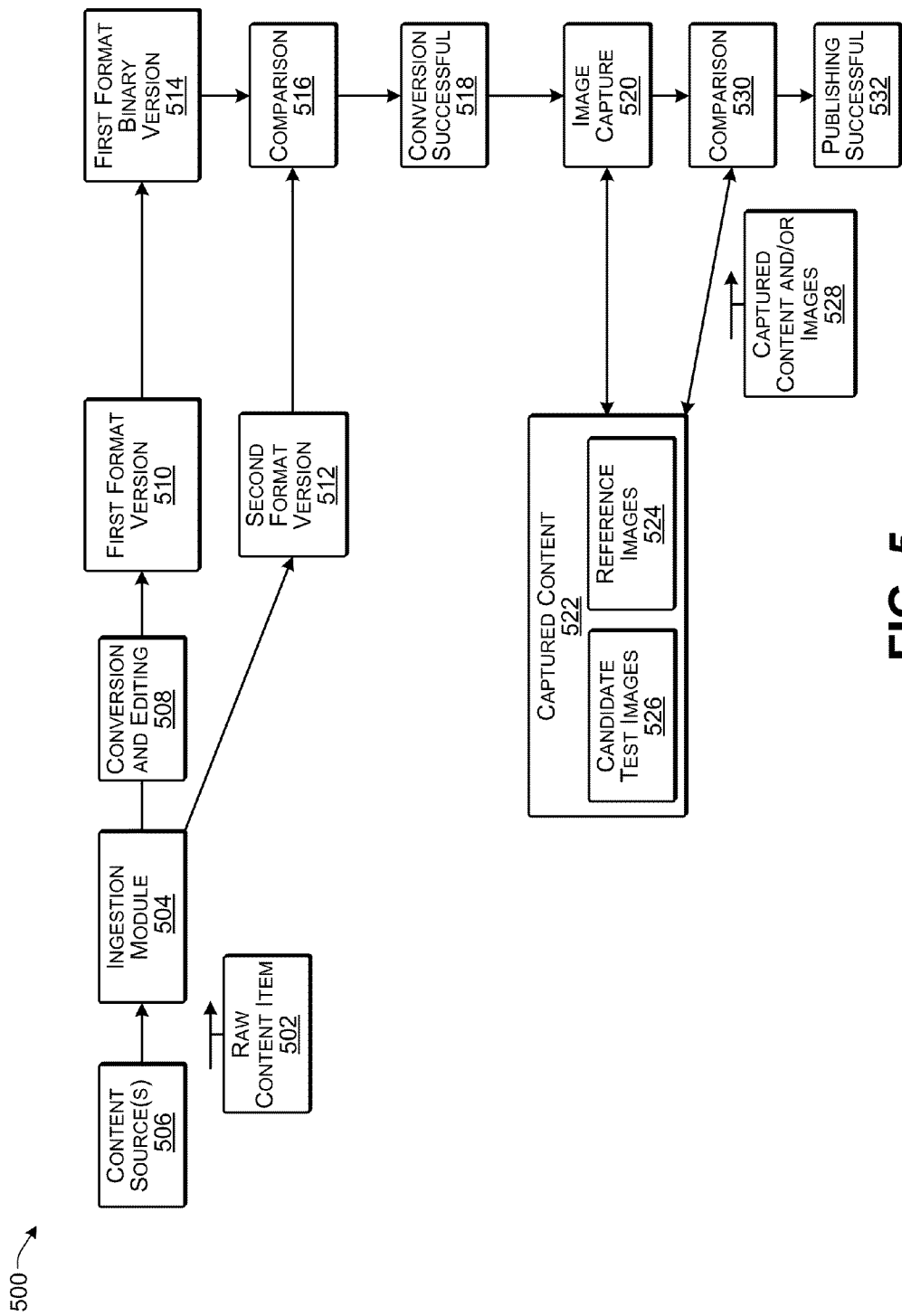
FIG. 5 illustrates an example overall framework for verifying conversion according to some implementations.

FIG. 5 illustrates an example overall framework 500 for verifying conversion of a content item according to some implementations. For example, two versions of the content item may be compared with respect to content and various properties or attributes of the content. This technique can aid in quantifying the success rate of the conversion of content items to particular file formats. For instance, the comparison may determine if there is missing content, any style differences in the content, and other basic differences between a version in a first file format and a version in a different or second file format. Furthermore, in some examples, the verification may include sequential progression through the content item to capture any warnings detected during rendering, and/or to analyze the stability of the content item. For example, some of the aspects of conversion such as the number of styles, the use of containers (i.e., content wrappers), or the like, may affect the stability of the content item. Thus, the testing techniques herein can test the stability of the content item during rendering.

The framework 500 of FIG. 5 provides an example overview for verification testing of a converted content item. In this example, a raw content item 502 is received by an ingestion module 504, such as from a content source 506, e.g., an author, publisher, or other source or repository of content items. As indicated at 508, the ingestion module 504 may perform conversion and/or editing of the raw content item 502 to obtain a first format version 510 of the content item in a first file format. Thus, in some examples, the ingestion module 504 may include the content item conversion module 160 discussed above with respect to FIG. 1. For example, the first format version 510 of the content item may be in a first file format, such as a format that will be used primarily for distributing the content item to a plurality of electronic devices. Several non-limiting examples of file formats may include various eBook formats, such as Kindle® KF8, Mobipocket™, EPUB®, PDF, EReader®, and so forth. In some cases, the first format version 510 may be manually checked to ensure integrity, and may serve as a master version or reference version of the content item. The content item (i.e., the raw version 502, the first format version 510, or some other version, if any) may also be converted to a second file format version 512. For example, the second file format may be an entirely different file format from the first file format, or may be a different version or different release of the same file format type as the first file format.

The second format version 512 of the content item in the second file format may be compared with the first format version 510 of the content item in the first file format, such as for ensuring that the second format version 512 has been properly converted and includes all the content and correct content attributes of the first format version 510. For example, the second format version 512 may be checked to verify that all of the content has been properly converted to the second file format and will render correctly. Further, the second format version 512 may be checked to verify that the content will be rendered with the correct attributes or style elements, such as correct layout, font description, font size, text alignment, borders, padding, margins, background, word spacing, letter spacing, text indents, and various other style elements. For example, if a particular letter or word is bolded, italicized and/or underlined in the first format version 510, the same letter or word should also have the same style in the second format version 512.

In some examples, when comparing the second format version 512 with the first format version 510, one or both of the versions to be compared may be converted to a binary version, such as first format binary version 514. The two versions may then be compared, as illustrated by comparison block 516. One example comparison framework corresponding to comparison block 516 is discussed below with respect to FIG. 6. In some examples, the comparison module 128 discussed with respect to FIG. 1 may perform the comparison of the second format version with the first format version, such as using the framework set forth in FIG. 6 or other suitable techniques. Following the comparison, if the comparison shows that any differences detected between the second format version 512 and the first format version 510 are within an acceptable threshold, then the conversion may be considered successful as indicated at 518. If not, then the second format version or a portion thereof may be flagged for review.

The converted content item may be additionally verified using techniques similar to the image comparison techniques discussed above with respect to FIGS. 1-4. For example, as indicated at 520, image capture may be used to generate captured content 522. For instance, the first format version 510 or the second format version 512 may be used to generate one or more reference images 524 using the image capture techniques discussed above. In some examples, the reference images 524 may be verified by a human reviewer. Subsequently, one or more other format versions may be subject to image capture to produce candidate test images 526. As indicated at 528, the captured images and or other captured content 528, such as rendering information, may be compared with the reference images or reference rendering information, as indicated at 530. If any differences between the compared images or rendering information are within a threshold amount, the publishing of the converted content item may be considered successful, as indicated at 532. Alternatively, if the differences are more than the threshold, the converted content item, or a portion thereof, may be flagged for review by a human reviewer.

Figure 6:
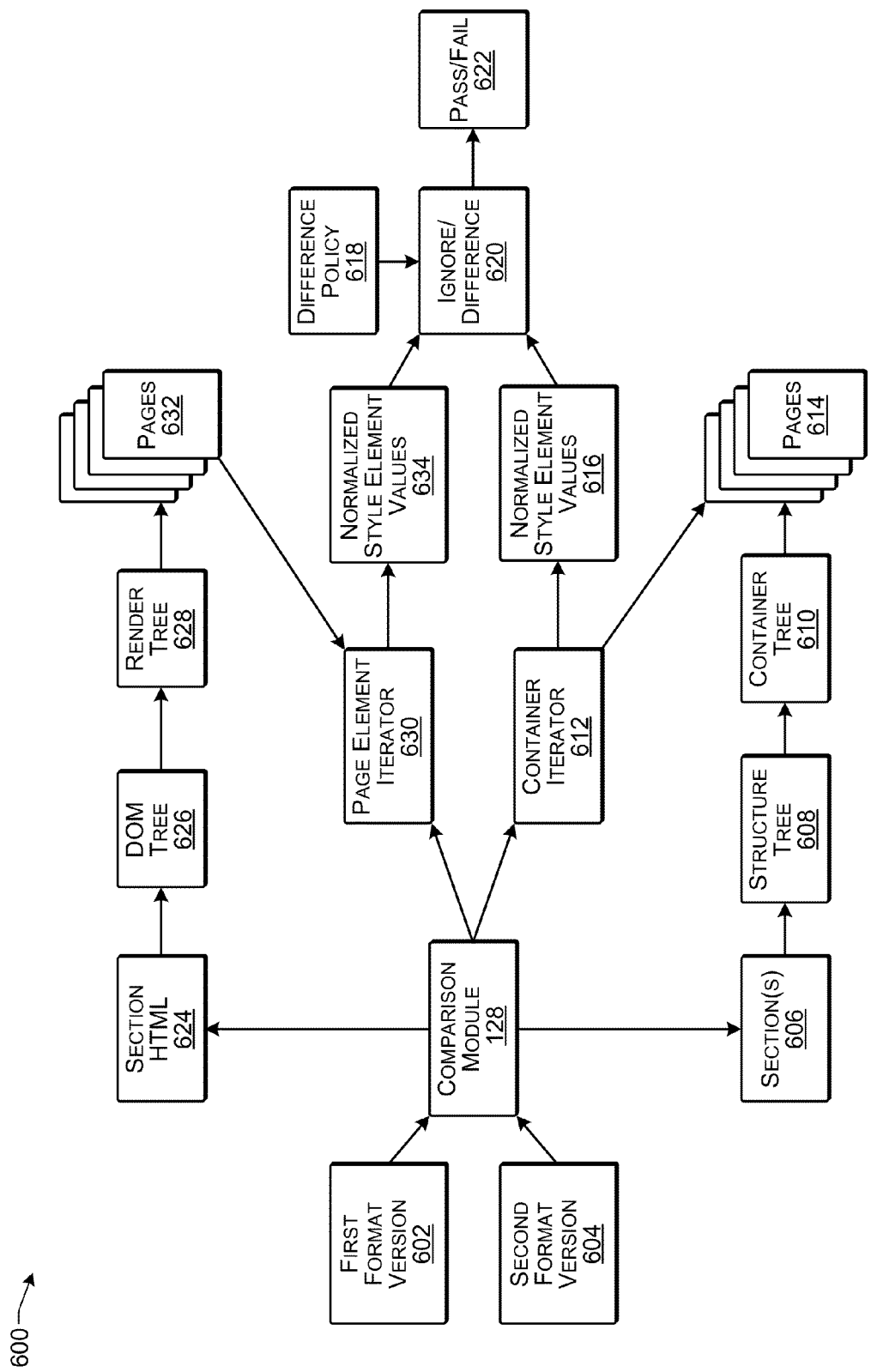
FIG. 6 illustrates an example framework for difference determination according to some implementations.

FIG. 6 illustrates an example framework 600 for verifying content and style elements of a converted content item according to some implementations. In some instances, the content and/or style elements of two versions of a content item may be compared without having to compare rendered images of each page of the content items on a pixel level. Instead, in some examples, the verification may include checking normalized values of final rendered page entities, such as by comparing a render tree of the first version with a render tree of the second version and calculating a distance between the property value of each element of the render tree. If the distance between a certain property goes above a certain threshold then a warning or error may be generated, such as by flagging a particular page and/or the entire content item.

In some cases, the nature and respective values of the thresholds may be context dependent and may be configurable at an API level. For instance, for font size, the threshold may be a percentage, e.g., the font size of the first version is within 5% of the font size of the second version. Similar difference thresholds may be established for other style elements such that if the difference between the two values of the same element is less than a particular percentage, then the comparison may be considered to pass verification. As another example, for image layouts, a threshold may be based, e.g., on a difference in the percentage of the screen area that is occupied by the image. The thresholds may vary between fixed text and reflowable text cases, such as by having stricter thresholds in cases in which the text on each page is fixed. Further, for some style elements, such as font style (e.g., bold, italic, underline, all caps, etc.), the threshold may be strict. For example, if a word is in bold text in the reference version, the word may also be verified as being in bold text in the other version to avoid generation of a flag.

In the illustrated example, a first format version 602 and a second format version 604 of a content item may be provided to, or accessed by, the comparison module 128. For example, the second version 604 may be the same content item in a different file format or different iteration of a file format from the first version 602. In some examples, the comparison module 128 may compare the content on a section level. Examples of sections may include chapters, views, segments of content, or other techniques for dividing the content of a content item into sections. Further, other examples may include comparison on a page-by-page level, a word-by-word level, a glyph-by-glyph level, or other variations.

In this example, for each version 602 and 604, the comparison module 128 may create a document, such as in HTML, and view objects corresponding to each of the first version and the second version. Further, for each version 602 and 604, the comparison module 128 may determine the sections 606 in the content item, determine a structure tree 608 based on the sections 606, and determine a container tree 610 that identifies content maintained in class wrappers or containers for rendering purposes. A container iterator 612 may iterate through the container tree 610, such as by iterating over pages 614 corresponding to each container. Normalized style values 616 may be established based on iteration of the first format version 602. The corresponding style values for the second format version 604 are compared with the normalized style values 616 to determine whether any differences between the first format version 602 and the second format version 604 are greater than a threshold amount for a particular style element. Examples of style elements for sections may include boarder attributes, text decoration, word spacing, letter spacing and text indents. For instance, a difference policy 618 may be applied for determine whether any differences between style elements exceed a threshold amount set forth in the difference policy 618. The differences between the two versions are compared as indicated at 620, a pass/fail decision 622 is determined based on the difference policy 618, and a flag or warning may be issued if fail decision is made.

Additionally, the HTML code 624 for each section may be used to determine a DOM (document object model) tree 626 for each section. A render tree 628 may be generated based on the corresponding DOM tree 626. For example, the HTML may be parsed into the DOM tree, which is a tree of nodes. The node types that are relevant to rendering may include a document node, element nodes, e.g., the tags that occur in HTML, and raw text. From a rendering perspective, an element node is a node with a tag name that can be used to cast to a specific subclass that can be queried for data that the renderer needs, such as for style effects. The rendering tree 628 may be created from the DOM tree by determining style information for each DOM node in the DOM tree 626.

A page element iterator may 630 may use the render tree 628 for each section to iterate through each section. The page element iterator 630 may render pages 632 on a page-by-page basis. The first format version 602 may be rendered to provide normalized style element values 634 corresponding to the HTML for the section. The style elements rendered from the HTML of the second format version 604 may be compared with the normalized style element values 634 of the first format version, and the difference policy 618 may be applied at 620 to determine whether particular style elements being compared pass or fail. For example, if the difference is more than the policy threshold then, as indicated at 622, a flag or warning may be issued. In some examples, such as in the case of a document with fixed pages, the corresponding page elements are matched with one another during the comparison. Examples of style elements that may be compared in this branch include element-level style elements, such as font description, font style, font size, and text alignment, as well as paragraph-level style elements such as border, padding, margins, background, and percentage of screen covered.

In addition, in other examples, the render trees 628 themselves may be compared with each other. For example, a first render tree generated from the first format version 602 may be compared directly with a second render tree generated from the second format version 604 for the same portion of the content item to determine any differences in the content or the style elements between the two versions of the render trees.

Figure 7:
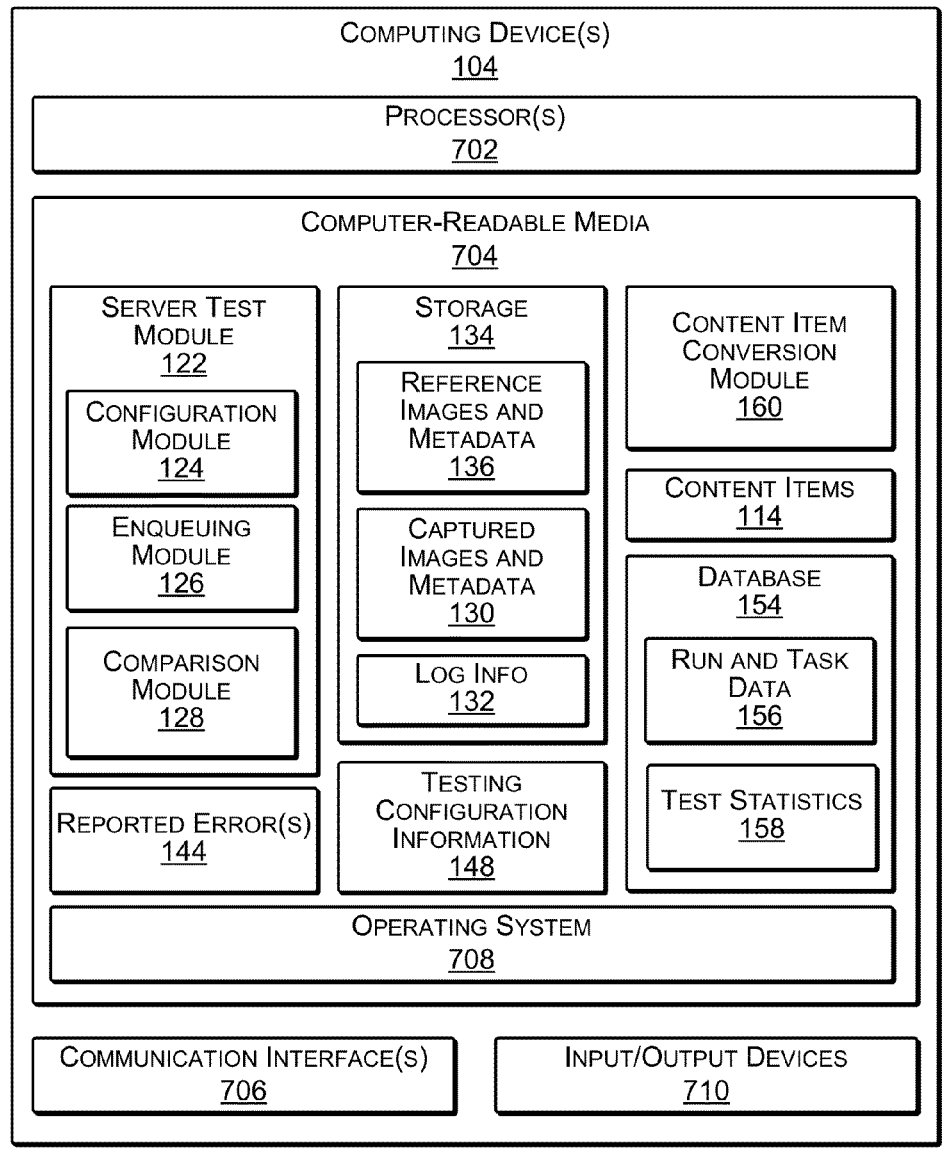
FIG. 7 illustrates select components of an example computing device according to some implementations.

FIG. 7 illustrates select components of the one or more computing devices 104 that may be used to implement some functionality of the testing techniques described herein. The one or more computing devices 104 may include one or more servers or other types of computing devices that may be embodied in any number of ways. For instance, in the case of a server, the modules, other functional components and data may be implemented on a single server, a cluster of servers, a server farm or data center, a cloud-hosted computing service, a cloud-hosted storage service, and so forth, although other computer architectures (e.g., a mainframe architecture) may also be used. Further, while the figures illustrate the components and data of the one or more computing devices 104 as being present in a single location, it is to be appreciated that these components may be distributed across different computing devices and different locations in any manner. Consequently, the testing functions may be implemented by one or more computing devices, with the various functionality described above distributed in various ways across the different computing devices. The computing devices 104 may be located together or separately, and organized, for example, as virtual servers, server banks and/or server farms. The described functionality may be provided by the servers of a single entity or enterprise, or may be provided by the servers and/or services of multiple different entities or enterprises. In some examples, the capture workers, the compare workers, and other computing devices discussed above with respect to FIG. 4 may have a similar hardware configuration to that illustrated in FIG. 7, with the functional components and data being distributed across these workers and cloud services as discussed above.

In the illustrated example, the one or more computing devices 104 include one or more processors 702, one or more computer-readable media 704, and one or more communication interfaces 706. Each processor 702 may be a single processing unit or a number of processing units, and may include single or multiple computing units or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or configured to execute the algorithms and processes described herein. The processor(s) 702 can be configured to fetch and execute computer-readable instructions stored in the computer-readable media 704.

The computer-readable media 704 may include volatile and nonvolatile memory and/or removable and non-removable media implemented in any type of technology for storage of information, such as computer-readable instructions, data structures, program modules or other data. Such computer-readable media may include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device(s) 104, the computer-readable media 704 may be a type of computer-readable storage media and/or may be a tangible non-transitory media.

The communication interface(s) 706 may include one or more interfaces and hardware components for enabling communication with various other devices over the network(s) 106, such as the test devices 102 and/or the reviewer computing devices 138. For example, communication interface(s) 706 may enable communication through one or more of the Internet, cable networks, cellular networks, wireless networks (e.g., Wi-Fi) and wired networks.

The computer-readable media 704 may be used to store any number of functional components that are executable by the processors 702. In many implementations, these functional components comprise instructions or programs that are executable by the processors 702 and that, when executed, specifically configure the one or more processors 702 to perform the actions attributed above to the one or more computing devices 104. Functional components stored in the computer-readable media 704 may include the server test module 122, including the configuration module 124, the enqueuing module 126, and the comparison module 128, as described above, which may be executed on the processors 702 for implementing the various functions and features of the testing described herein. Additional functional components stored in the computer-readable media 704 may include the content conversion module 160 and an operating system 708 for controlling and managing various functions of the one or more computing devices 104.

In addition, the computer-readable media 704 may store data used for the testing described herein. Thus, the computer-readable media may encompass the storage 134 containing the reference images and metadata 136, the captured images and metadata 130, and the log information 132. Additional data and information stored on the computer readable media 704 may include the database 154, including the run and task data 156 and the test statistics 158. Testing configuration information 148, content items 114 used during the testing, and reported errors 144 may also be stored in the computer-readable media 704. The one or more computing devices 104 may also include many other logical, programmatic and physical components, of which those described above are merely examples that are related to the discussion herein.

The one or more computing devices 104 may further be equipped with various input/output devices 710. Such I/O devices 710 may include a display, various user interface controls (e.g., buttons, joystick, keyboard, mouse, touch screen, etc.), audio speakers, connection ports and so forth.

Figure 8:
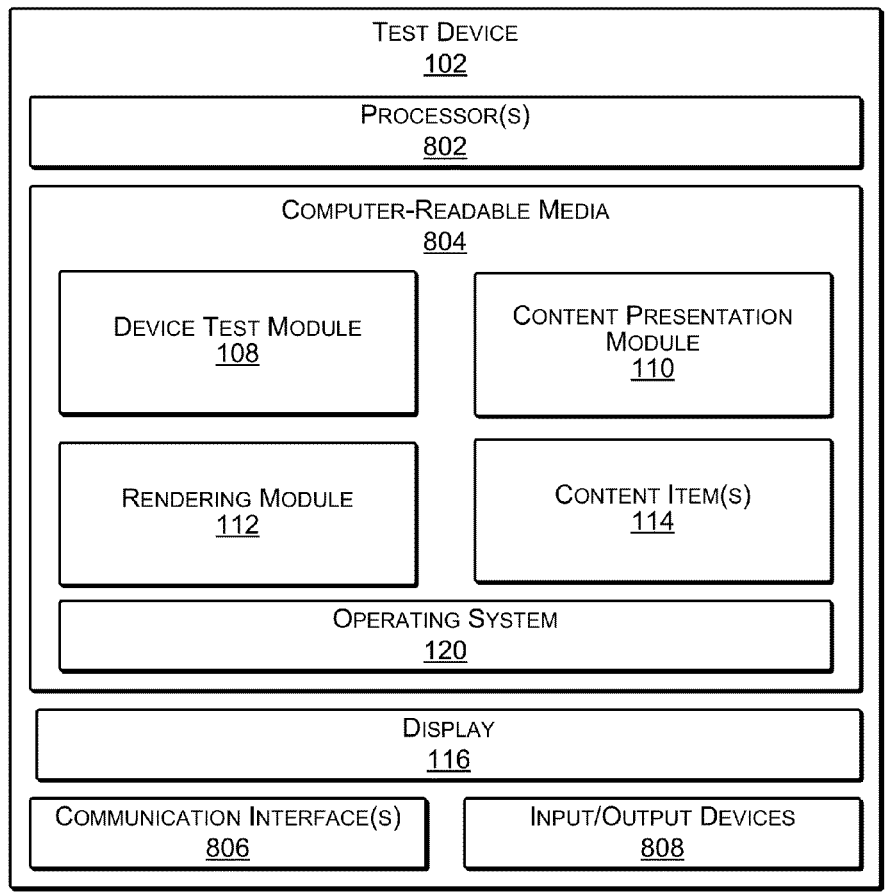
FIG. 8 illustrates select components of an example test device according to some implementations.

FIG. 8 illustrates select components of an example test device 102 that may be used for testing according to some implementations. The test device 102 may be implemented as any of a number of different types of electronic devices, some examples of which are described above with reference to FIG. 1. In a very basic configuration, the test device 102 includes, or accesses, components such as at least one control logic circuit, central processing unit, or processor 802, and one or more computer-readable media 804. Each processor 802 may itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some cases, the processor 802 may be one or more hardware processors and/or logic circuits of any suitable type specifically programmed or configured to execute the algorithms and processes described herein. The processor 802 can be configured to fetch and execute computer-readable instructions stored in the computer-readable media 804.

Depending on the configuration of the test device 102, the computer-readable media 804 may be an example of tangible non-transitory computer-readable media and may include volatile and nonvolatile memory and/or removable and non-removable media implemented in any type of technology for storage of information such as computer-readable instructions, data structures, program modules or other data. The computer-readable media 804 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the test device 102 may access external storage, such as a connected host computer, RAID storage systems, storage arrays, network attached storage, storage area networks, cloud storage, or any other medium that can be used to store information and that can be accessed by the processor 802 directly or through another computing device or network. Accordingly, the computer-readable media 804 may be computer storage media able to store instructions, modules or components that may be executed by the processor 802.

The computer-readable media 804 may be used to store and maintain any number of functional components that are executable by the processor 802. In some implementations, these functional components comprise instructions or programs that are executable by the processor 802 and that, when executed, implement operational logic for performing the actions attributed above to the test device 102. Functional components of the test device 102 stored in the computer-readable media 804 may include the device test module 108, the content presentation module 110, the rendering module 112 and the operating system 120.

In addition, the computer-readable media 804 may also store data, data structures and the like, that are used by the functional components. For example, data stored by the computer-readable media 804 may include one or more content items 114 that are used during testing. Depending on the type of the test device 102, the computer-readable media 804 may also optionally include other functional components and data, which may include programs, drivers and so forth, and the data used by the functional components. Further, the test device 102 may include many other logical, programmatic and physical components, of which those described are merely examples that are related to the discussion herein. Further, while the figures illustrate the functional components and data of the test device 102 as being present on the test device 102 and executed by the processor 802 on the test device 102, it is to be appreciated that a portion of these components and/or data may be distributed across different computing devices and locations in any manner. For instance, in some cases, a connected host computing device may execute a portion of the device test module 108, as discussed above.

FIG. 8 further illustrates the display 116, which may be passive, emissive or any other form of display. In some cases, the display 116 may be an electronic paper display, such as an electrophoretic or electrowetting display. In other cases, the display 116 may be a backlit LCD display, an OLED (organic light-emitting diode) display, or any other suitable type of display able to present rendered content thereon.

The test device 102 may further include one or more communication interfaces 806, which may support both wired and wireless connection to various networks, such as cellular networks, radio, Wi-Fi networks, close-range wireless connections, near-field connections, infrared signals, local area networks, wide area networks, the Internet, and so forth. The communication interfaces 806 may further allow a user to access storage on or through another device, such as the host computing device 404, capture workers 402, a network attached storage device, cloud storage, or the like.

The test device 102 may further be equipped with various other input/output (I/O) components 808. Such I/O components 808 may include a touchscreen and various user controls (e.g., buttons, a joystick, a keyboard, a mouse, a keypad, etc.), connection ports, and so forth. Additionally, the test device 102 may include various other components that are not shown, examples of which include removable storage, a power source, such as a battery and power control unit, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 9:
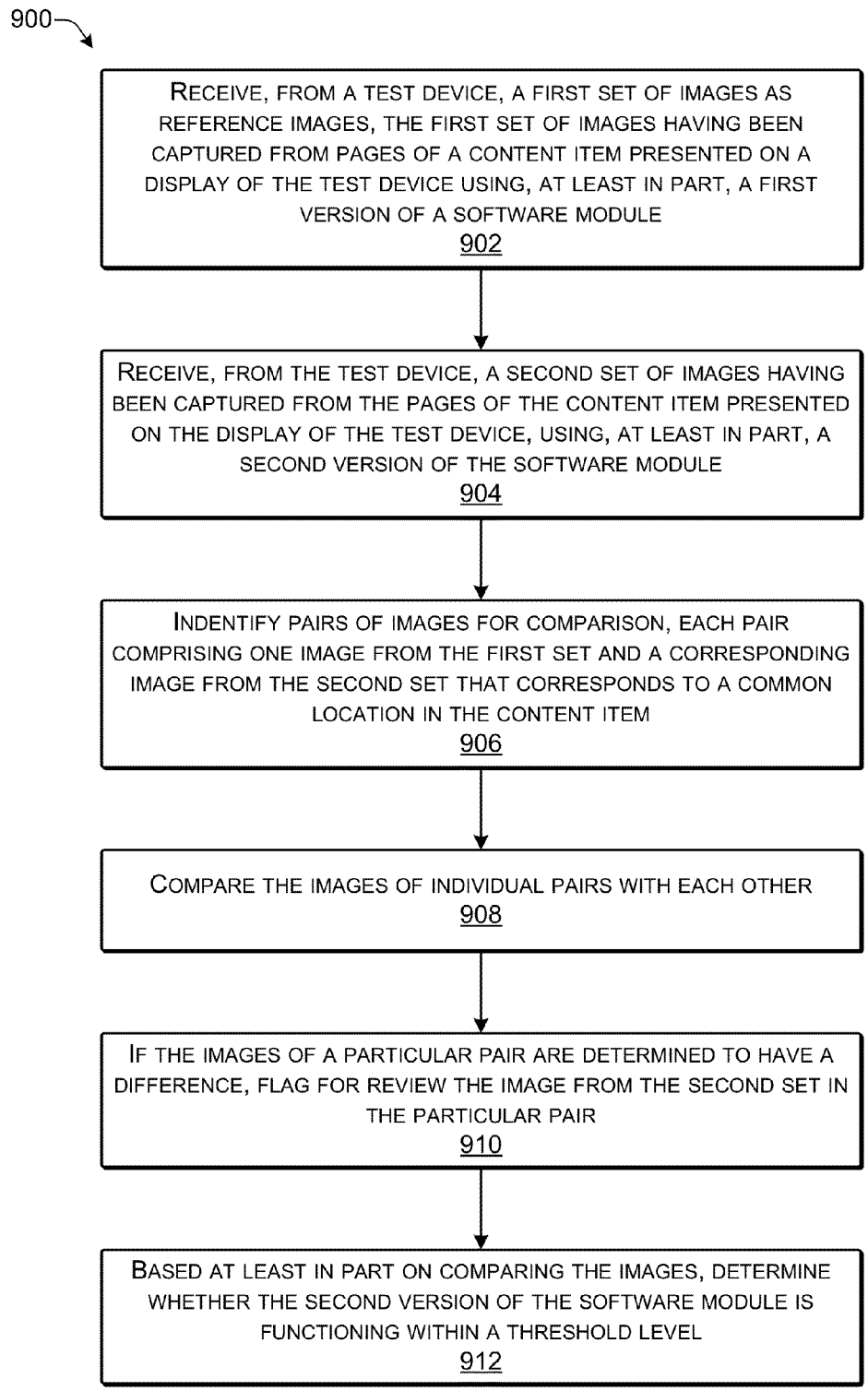
FIG. 9 is a flow diagram illustrating an example process for performing testing according to some implementations.
Figure 10:
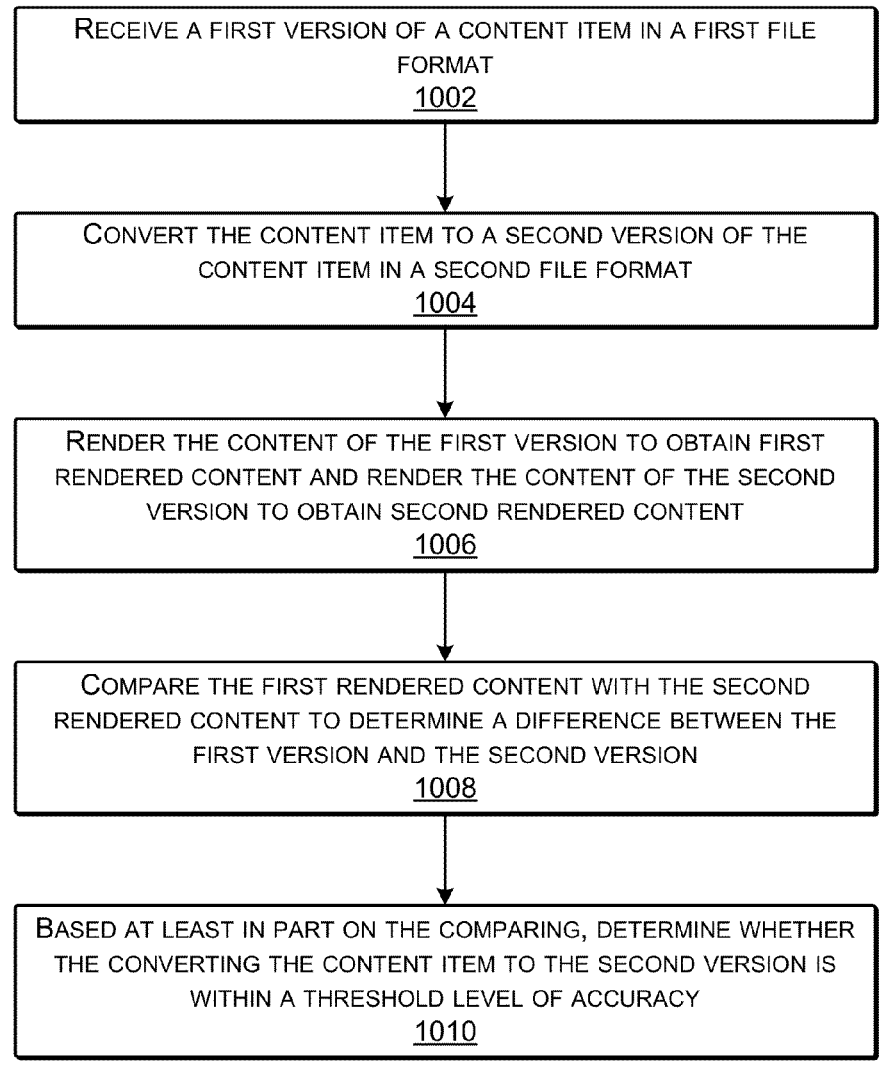
FIG. 10 is a flow diagram illustrating an example process for performing testing according to some implementations.

FIGS. 9 and 10 illustrate example processes according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

FIG. 9 is a flow diagram illustrating an example process 900 that may be executed, at least in part, by one or more computing devices to perform testing according to some implementations.

At 902, the one or more computing devices receive, from a test device, a first set of images as reference images. For example, the first set of images may have been captured from pages of a content item, such as an electronic book, presented on a display of the test device using, at least in part, a first version of a software module. Further, the first set of images may have been verified to have rendered correctly by human reviewers. Furthermore, the first set of images may correspond to a particular presentation setting on the test device, such as at least one of a specified font style, font size, font color, line spacing, margin configuration, or background configuration.

At 904, the one or more computing devices receive, from the test device, a second set of images. For example, the second set of images may have been captured from the pages of the content item presented on the display of the test device, using, at least in part, a second version of the software module. The second set of images may also correspond to the particular presentation setting on the test device. Further, in some examples, the second set of image may be received from a different test device than the first set of images, but the different test device may be of a same type (e.g., same general hardware configuration) and/or may include the same operating system as the first test device. Additionally, in some examples, the test device may be an electronic device including the rendering module and a presentation module for presenting the images on the display. In other examples, the test device may be a computing device configured to emulate an electronic device, and the computing device may include the rendering module and the presentation module, or a presentation module emulator, for presenting the images on a display associated with the computing device. For example, a general purpose computing device may function as the test device by including one or more software-based emulators that can emulate one or more hardware or software functionalities.

At 906, the one or more computing devices indentify pairs of images for comparison, each pair comprising one image from the first set and a corresponding image from the second set that corresponds to a common location in the content item. For example, the first page in the first set is compared with the first page in the second set, the second page in the first set is compared with the second page in the second set, and so forth.

At 908, the one or more computing devices compare the images of individual pairs with each other. As one example, the comparison may include representing the first image a first histogram, representing the second image as a second histogram, and comparing the first histogram with the second histogram to determine the difference. For instance, the difference may be determined based on a difference in top color intensities, and a tolerance threshold may be applied to ignore minor differences in the histograms. The threshold may be determined empirically in some cases.

At 910, if the images of a particular pair are determined to have a difference, the one or more computing devices flag for review the image from the second set in the particular pair. If the difference between the two images is determined to be outside the tolerance threshold, the image of the second set may be flagged for review by a human reviewer.

At 912, based at least in part on comparing the images, the one or more computing devices may determine whether the second version of the software module is functioning within a threshold level of accuracy. For example, if one or more test images are flagged for review, based on the difference between the test image and the reference image exceeding a threshold difference, then the one or more computing devices may determine that the software is not functioning within a threshold level of accuracy, such as a threshold level for accurately rendering pages of an electronic book. In some examples, the threshold level of accuracy may be determined as discussed above, such as based a distance between certain properties of the reference image and the test image, e.g., correctness of the rendered text, correct layout of the text, correct background, and so forth. In other examples, the threshold level of accuracy may be based at least in part on the difference between histograms of the two images. In either event, as long as the difference for any pair of pages in a content item does not exceed a threshold difference, then the software module may be deemed to be functioning within the threshold level of accuracy. On the other hand, if during the comparison, one or more test pages differ from its corresponding reference page by more than the threshold difference, then the software may be deemed to functioning outside of the threshold level of accuracy. In such a case, the one or more computing devices may send a message to a computing device of a person or team responsible for the software module to provide a notification that there may be a problem with the second version of the software module.

FIG. 10 is a flow diagram illustrating an example process 1000 that may be executed by one or more computing devices to perform testing according to some implementations.

At 1002, the one or more computing devices receive a first version of a content item in a first file format. For example, the first version of the content item may be in a format provided by an author or publisher. Alternatively, the first version of the content item may have been converted to the first file format from another format, such as during ingestion of the content item, or at any other time. In some examples, the first version may be a master or reference version of the content item.

At 1004, the one or more computing devices convert the content item to a second version of the content item in a second file format. For example, the content item may be converted to a second file format that is compatible with a particular presentation application or presentation module for use on a variety of different types of devices. In some examples, the content item is converted from the first format to the second format. In other examples, the content item is converted to the second format from a format other than the first format. In these examples, the first file format may differ from the second file format by being an upgrade, a different release, or a different version of the same file format, or they may differ from each other by being entirely different types of file formats.

At 1006, the one or more computing devices render the content of the first version of the content item to obtain first rendered content, and render the content of the second version of the content item to obtain second rendered content. For example, the rendering may include at least generating a first render tree for the first version and a second render tree for the second version. In some cases, the rendering may further include rendering pages of the first version and the second version.

At 1008, the one or more computing devices compare the first rendered content with the second rendered content to determine a difference between the first version and the second version. As one example, the first render tree corresponding to the first version may be compared with the second render tree corresponding to the second version. As another example, pairs of rendered pages from the first rendered content and the second rendered content that correspond with each other may be iterated and compared for content and style elements.

At 1010, based at least in part on the comparing, the one or more computing devices determine whether the converting the content item to the second version is within a threshold level of accuracy. For example, similar to the discussion above with respect to 912, if the differences between the first version and the second version are less than a threshold amount, the one or more computing devices may determine that the conversion is sufficiently accurate to allow the converted second version to be provided to consumers, such as customers who may wish to purchase access to the content item. On the other hand, if the differences between the first version and the second version exceed a threshold amount, the one or more computing devices may determine that the conversion does not meet a threshold level of accuracy, and the one or more computing devices may flag the converted content item, and/or may notify a team responsible for the conversion software that there may be a problem with the conversion software.

In other examples, the comparison module may use OCR to convert the content of one or more images from at least one of the first rendered content or the second rendered content to electronic text. The text recognized from the images may be compared with text in the originally received content item, such as on a word-by-word or character-by-character (glyph-by-glyph) basis. If a difference beyond a threshold tolerance is detected, the converted content item may be determined to be faulty, and an error report may be issued.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   one or more processors; and
   one or more computer-readable media maintaining instructions which, when executed by the one or more processors, cause the one or more processors to perform acts comprising:
   receiving reference images from a test device, the reference images having been captured from pages of an electronic book presented on a display associated with the test device using, at least in part, a first version of an electronic book rendering module, the reference images having been verified to have rendered correctly, wherein the reference images correspond to a particular presentation setting on the test device;

receiving, from the test device, test images having been captured from the pages of the electronic book presented on the display associated with the test device, using, at least in part, a second version of the electronic book rendering module, wherein the test images correspond to the particular presentation setting on the test device;

identifying at least one pair of images for comparison, the pair of images comprising a paired reference image from the reference images and a corresponding paired test image from the test images, wherein the paired reference image and the paired test image each correspond to a common location in the electronic book;

comparing the paired reference image with the paired test image; and if the paired reference image is determined to differ from the paired test image, flagging for review the paired test image.

2. The system as recited in claim 1, wherein the test device is at least one of:

an electronic device including a presentation module for presenting the images on the display; or a computing device configured to emulate an electronic device, the computing device including the presentation module, or a presentation module emulator, for presenting the images on the display.

3. The system as recited in claim 1, wherein the one or more processors are further configured to determine the common location based at least in part on determining that the paired test image and the paired reference image correspond to a same page of the electronic book.

4. The system as recited in claim 1, wherein the particular presentation setting includes at least one of: font style, font size, font color, line spacing, margin configuration, or background configuration.

5. The system as recited in claim 1, wherein the one or more processors comprise multiple worker computing devices, wherein a first worker computing device is configured to provide a queuing service, the queuing service adding a task to a queue of the queuing service in response to receiving a message from the test device, the task indicating the test images have been generated, wherein the comparing is executed by a second worker computing device based at least in part on receiving the task from the queue.

6. A method comprising:

receiving, by one or more processors, a first image of a portion of a content item presented by a reference device;

receiving a second image of the portion of the content item presented subsequently by a test device, wherein the second image corresponds to presentation of the content item using, at least in part, a different version of the software than was used for presentation of the content item for obtaining the first image;

comparing the first image with the second image to determine whether there is a difference between the first image and the second image; and based at least in part on the comparing, determining whether the different version of the software is functioning within a threshold level of accuracy.

7. The method as recited in claim 6, wherein determining whether there is a difference between the first image and the second image further comprises:

representing the first image as a first histogram;

representing the second image as a second histogram; and comparing the first histogram with the second histogram to determine whether a difference between first histogram and the second histogram exceeds a threshold difference.

8. The method as recited in claim 6, further comprising, if the difference between the first image and the second image exceeds a threshold difference, flagging the second image for review; and in response to a determination during the review that the second image rendered correctly, replacing the first image with the second image as a reference image.

9. The method as recited in claim 6, further comprising receiving information related to the rendering of the second content item, the information providing at least one of:

an amount of time to render a particular portion of the content item;

data indicative of whether an error occurred during rendering of the content item; or data indicative of processing performance and/or memory consumption during rendering of the content item.

10. The method as recited in claim 6, further comprising, prior to receiving the second image, sending a task to the test device, the task indicating at least the content item and one or more presentation settings to be applied during presentation of the content item on the test device, wherein the one or more presentation settings include at least one of: font style, font size, font color, line spacing, margin configuration, or background configuration.

11. The method as recited in claim 6, further comprising receiving metadata associated with the second image, the metadata indicating at least one of:

a type of the test device;

an operating system of the test device;

an identifier of the content item; or a presentation setting used.

12. The method as recited in claim 6, further comprising:

receiving a plurality of first images, respective ones of the first images corresponding to respective different presentations settings;

receiving a plurality of the second images, respective ones of the second images corresponding to the respective different presentation settings; and comparing the first images with the second images by comparing images obtained using same presentation settings.

13. The method as recited in claim 6, wherein the reference device and the test device include a same operating system.

14. The method as recited in claim 6, wherein the reference device includes a first software version emulator and the test device includes a different software version emulator.

15. The method as recited in claim 6, wherein:

the test device comprises the reference device; or the test device is different from the reference device.

16. The method as recited in claim 6, wherein the software comprises at least one of:

a rendering module for rendering content of the content item into a rendered image; or a presentation module for presenting the rendered image of the content on a display.

17. A method comprising:

receiving, by one or more processors, a first version of a content item in a first file format;

converting the content item to second version of the content item in a second file format;

rendering content of the first version to obtain first rendered content and rendering content of the second version to obtain second rendered content;

comparing the first rendered content with the second rendered content to determine a difference between the first version and the second version; and based at least in part on the comparing, determining whether the converting the content item to the second version is within a threshold level of accuracy.

18. The method as recited in claim 17, further comprising comparing style elements in the first rendered content with corresponding style elements in the second rendered content to determine the difference between the first version and the second version.

19. The method as recited in claim 18, wherein the style elements comprise at least one of: font description, font style, font size, text alignment, padding, margins, background, percentage of screen covered, border attributes, text decoration, word spacing, letter spacing and text indents.

20. The method as recited in claim 17, wherein the rendering the content of the first version and the content of the second version comprises generating at least a first render tree corresponding to the first version and a second render tree corresponding to the second version.

21. The method as recited in claim 17, wherein the comparing comprises:

receiving one or more images from at least one of the first rendered content or the second rendered content;

recognizing text in the one or more images based on optical character recognition; and comparing the recognized text with text of the content item in at least one of the first file format or the second file format.

* * * * *